(12) United States Patent
Peric

(10) Patent No.: US 7,721,973 B2
(45) Date of Patent: May 25, 2010

(54) VALVE

(75) Inventor: Yuri Peric, Oakville (CA)

(73) Assignee: Dana Canada Corporation, Oakville, Ontario (CA)

( * ) Notice: Subject to any disclaimer, the term of this patent is extended or adjusted under 35 U.S.C. 154(b) by 597 days.

(21) Appl. No.: 11/695,985

(22) Filed: Apr. 3, 2007

(65) Prior Publication Data

US 2008/0245881 A1   Oct. 9, 2008

(51) Int. Cl.
*G05D 23/12* (2006.01)
(52) U.S. Cl. .............................. 236/93 R; 137/625.49; 236/34.5
(58) Field of Classification Search .............. 236/34.5, 236/93 R, 93 A; 137/625.49
See application file for complete search history.

(56) References Cited

U.S. PATENT DOCUMENTS

| | | | | |
|---|---|---|---|---|
| 3,682,380 A | * | 8/1972 | Aziz | 236/34.5 |
| 3,907,199 A | * | 9/1975 | Kreger | 237/12.3 B |
| 4,024,909 A | | 5/1977 | Hofmann, Jr. | |
| 4,356,833 A | | 11/1982 | Mayfield, Jr. et al. | |
| 4,508,132 A | | 4/1985 | Mayfield, Jr. et al. | |
| 4,537,346 A | * | 8/1985 | Duprez | 236/34.5 |
| 4,562,953 A | * | 1/1986 | Duprez et al. | 236/34.5 |
| 4,846,219 A | | 7/1989 | Schaefer | |
| 5,011,074 A | | 4/1991 | Kline | |
| 5,423,373 A | | 6/1995 | Ramberg | |
| 5,755,283 A | | 5/1998 | Yates et al. | |
| 5,791,557 A | | 8/1998 | Kunze | |
| 5,809,944 A | | 9/1998 | Aoki et al. | |
| 5,896,833 A | | 4/1999 | Aoki | |
| 5,934,552 A | | 8/1999 | Kalbacher et al. | |
| 5,950,576 A | | 9/1999 | Busato et al. | |
| 5,974,827 A | * | 11/1999 | Hosking et al. | 62/468 |
| 5,979,778 A | | 11/1999 | Saur | |
| 6,039,263 A | | 3/2000 | Kalbacher et al. | |
| 6,253,837 B1 | | 7/2001 | Seiler et al. | |
| 6,286,464 B1 | | 9/2001 | Abraham et al. | |
| 6,343,746 B2 | * | 2/2002 | Chamot et al. | 236/34.5 |
| 6,435,143 B2 | | 8/2002 | Hollis | |
| 6,520,418 B2 | | 2/2003 | Kunze et al. | |
| 6,536,464 B1 | | 3/2003 | Lum et al. | |
| 6,539,899 B1 | | 4/2003 | Piccirilli et al. | |

(Continued)

FOREIGN PATENT DOCUMENTS

CA   2459088   8/2005

(Continued)

*Primary Examiner*—William E Tapolcai
(74) *Attorney, Agent, or Firm*—Ridout & Maybee LLP

(57) ABSTRACT

A valve comprising a body and a plug is disclosed. The body has a pair of ports and a tubular structure having a side wall and an open end and defining interiorly a first subchamber communicating with one port. The wall has an opening. The body defines a second subchamber communicating with the other port, extending around the wall and beyond the end to communicate with the end and the opening. The plug has an opening, is mounted to the structure and telescopes between first and second positions. At the second position, the plug is disposed at least partly in the second subchamber and the valve defines, between the ports: a first flow path through the wall opening; and a second flow path through the open end of the structure, via the plug opening. At the first position, the plug and structure restrict flow through the first and second paths.

15 Claims, 16 Drawing Sheets

U.S. PATENT DOCUMENTS

| | | |
|---|---|---|
| 6,634,322 B2 | 10/2003 | Cohen |
| 6,681,805 B2 | 1/2004 | McLane et al. |
| 6,688,333 B2 | 2/2004 | McLane et al. |
| 6,695,217 B2 * | 2/2004 | Leu et al. ............... 236/34.5 |
| 6,745,995 B2 | 6/2004 | Hu et al. |
| 6,772,958 B1 * | 8/2004 | Lamb et al. ............. 236/34.5 |
| 6,793,012 B2 | 9/2004 | Fang et al. |
| 6,799,631 B2 | 10/2004 | Acre |
| 6,820,817 B2 | 11/2004 | Leu |
| 6,843,210 B2 | 1/2005 | Engelin et al. |
| 6,863,221 B2 | 3/2005 | Colas et al. |
| 6,929,187 B2 | 8/2005 | Kempf et al. |
| 7,028,712 B2 | 4/2006 | Wears et al. |
| 2003/0019620 A1 | 1/2003 | Pineo et al. |
| 2005/0061375 A1 | 3/2005 | Baumann |

FOREIGN PATENT DOCUMENTS

| | | |
|---|---|---|
| EP | 138618 | 4/1985 |
| EP | 634 596 | 1/1995 |
| JP | 8114397 | 5/1996 |

* cited by examiner

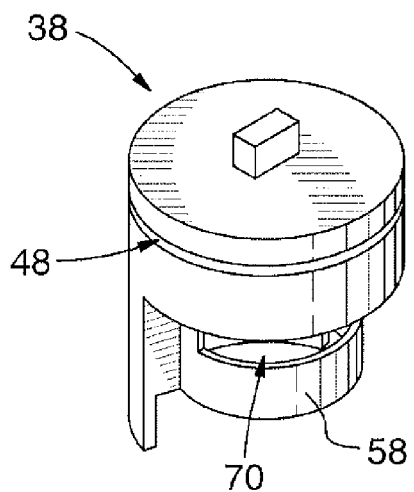
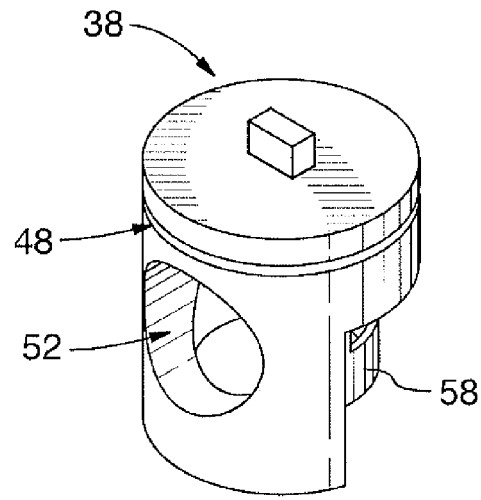
FIG.9    FIG.10
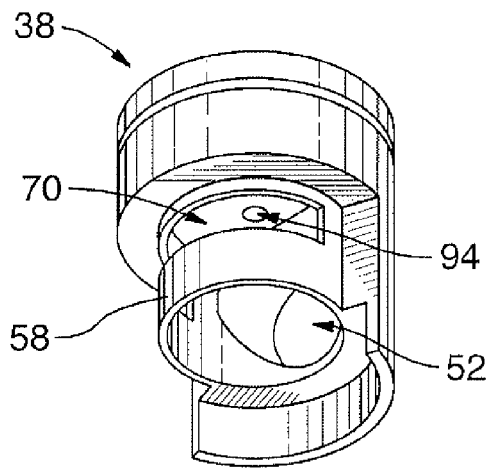
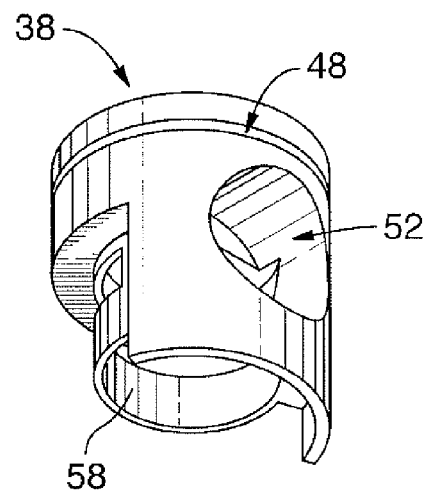
FIG.11    FIG.12

VALVE

FIELD OF THE INVENTION

The present invention generally relates to a valve for controlling the flow of fluid.

BACKGROUND OF THE INVENTION

In automobile engines, a fluid or coolant is typically used to carry excess heat from the engine to the radiator. Usually, such coolant is continuously circulated, by an engine-driven pump, through the engine until its temperature exceeds a predetermined level, at which point a portion of the flow is routed through the radiator. The flow is continuously adjusted in an attempt to maintain the temperature of the coolant within a desired range. Often, this is done via a valve that is actuated by a wax motor that is immersed in the flow.

In a known prior art fluid circuit, the radiator and a closure valve are connected in series in the coolant circuit, and a bypass circuit is connected in parallel across the radiator and closure valve. The valve is configured so as to block the flow of coolant through the radiator when the valve is closed. When the valve is closed, the coolant continues to circulate through the engine via the bypass circuit. A disadvantage associated with this configuration is that the bypass flow path remains open at all times such that a substantial portion of the flow of coolant always bypasses the radiator, even if maximum cooling is called for.

Various valves form part of the prior art.

To avoid the problems associated with a permanent bypass flow, these valves provide for the selection between a heat exchanging fluid circuit, which passes through the radiator, or a non-heat exchanging fluid circuit, which short circuits or bypasses the radiator. However, known valves are either relatively expensive, relatively non-robust, or have relatively poor flow characteristics.

SUMMARY OF THE INVENTION

A valve for use with a fluid forms one aspect of the invention. This valve comprises a valve body and a plug. The valve body has: a pair of spaced-apart flow ports; an interior chamber; an interior wall at least partially dividing the interior chamber into a first subchamber to which one of the flow port leads and a second subchamber to which the other of the flow ports leads, the interior wall having a wall opening therethrough leading between the first subchamber and the second subchamber; an interior opening providing for communication between the first subchamber and the second subchamber; and a further flow port spaced-apart from the interior opening along an axis. The plug has a plug opening therein, and is axially moveable in the interior chamber between and a first position and a second position. At the second position, the plug seals the further flow port and the valve defines a first flow path between the spaced-apart flow ports, through the wall opening; and a second flow path between the spaced-apart flow ports, through the interior opening and the plug opening. At the first position, the interior wall seals the plug opening and the plug seals the interior opening and the wall opening, thereby to at least substantially isolate the first subchamber from the second subchamber and channel the flow through a further flow path for said fluid through the valve body between the other of the flow ports and the further flow port.

According to another aspect of the invention, the first flow path and the second flow path can collectively define a primary flow path, and the primary flow path and the further flow path can each be free of substantial constrictions over their respective lengths.

A valve for use with a fluid forms yet another aspect of the invention. This valve comprises a valve body and a plug. The valve body has a pair of spaced-apart flow ports and includes a tubular structure. The tubular structure has a side wall and an open end and defines interiorly a first subchamber in fluid communication with one of the flow ports. The wall has a wall opening therethrough. The body further defines a second subchamber in fluid communication with the other of the flow ports, the second subchamber extending around the side wall and extending beyond the open end to further fluidly communicate with the open end and the wall opening. The plug has a plug opening and is mounted to the tubular structure for telescopic movement between a first position and a second position. At the second position, the plug is disposed at least in part in the second subchamber and the valve defines: a first flow path between the flow ports through the wall opening; and a second flow path between the flow ports through the open end of the tubular structure and the plug opening. At the first position, the plug and tubular structure interact to restrict flow through the first flow path and the second flow path.

The present invention permits the construction of a relatively low cost, relatively robust valve, which exhibits relatively good flow characteristics. Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter being briefly described hereinafter.

BRIEF DESCRIPTION OF THE DRAWINGS

FIG. 9 is an enlarged view of encircled area 9 of FIG. 2

FIG. 10 is a perspective view of the structure of FIG. 9, from another vantage point;

FIG. 11 is a perspective view of the structure of FIG. 9, from another vantage point;

FIG. 12 is a perspective view of the structure of FIG. 9, from another vantage point;

DETAILED DESCRIPTION

Figure 1:
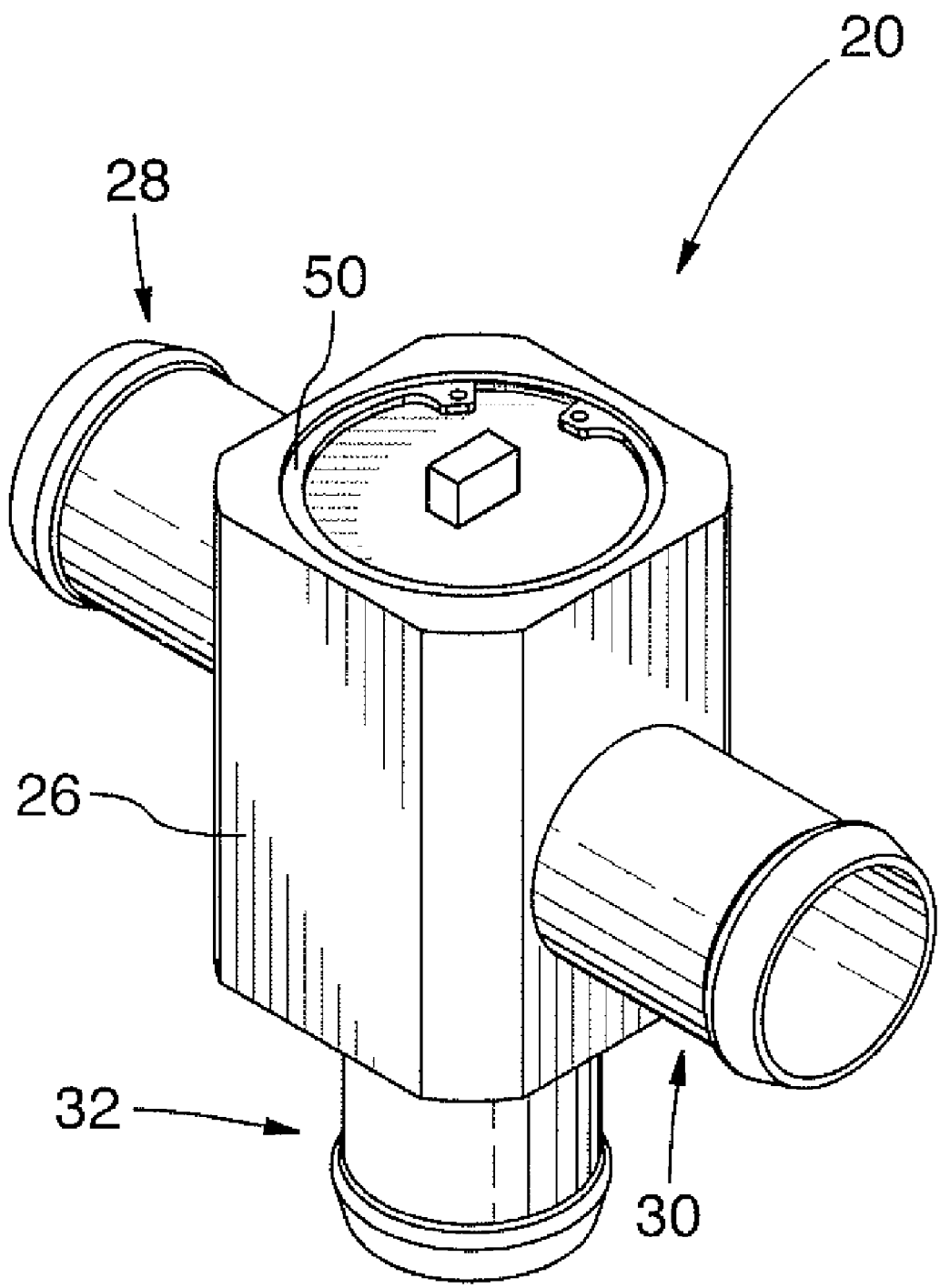
FIG. 1 is a perspective view of a valve according to one embodiment of the invention.

With general reference to FIGS. 1-13C, a first embodiment of the present invention, a valve for use with a fluid such as engine coolant, is illustrated and is designated by the general reference numeral 20.

Figure 2:
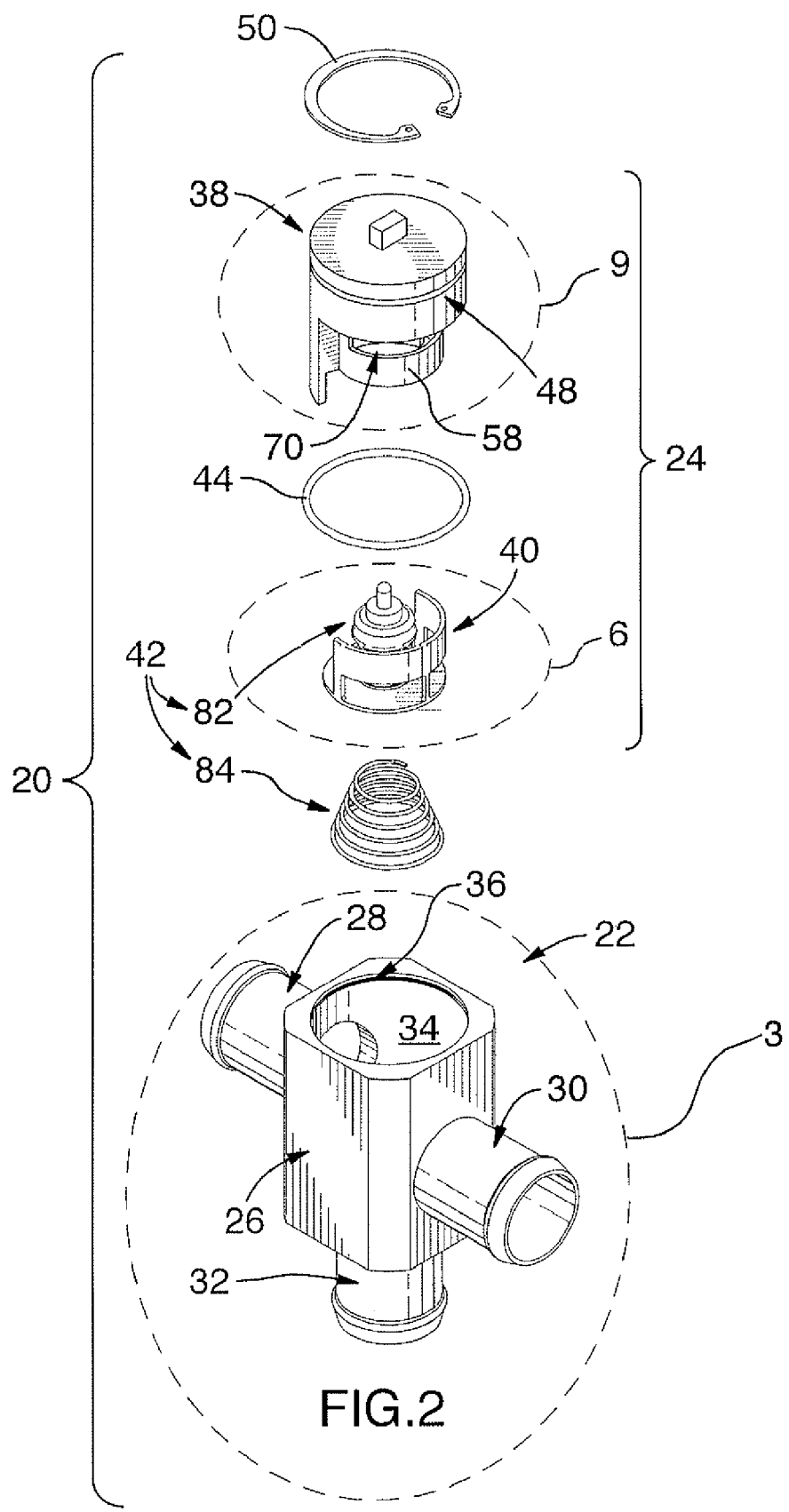
FIG. 2 is an exploded perspective view of the structure of FIG. 1.
Figure 3:
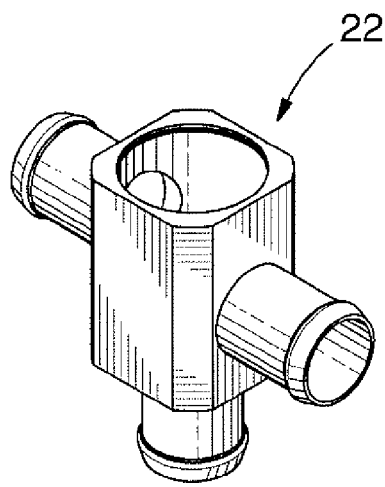
FIG. 3 is a view of encircled area 3 of FIG. 2.
Figure 4:
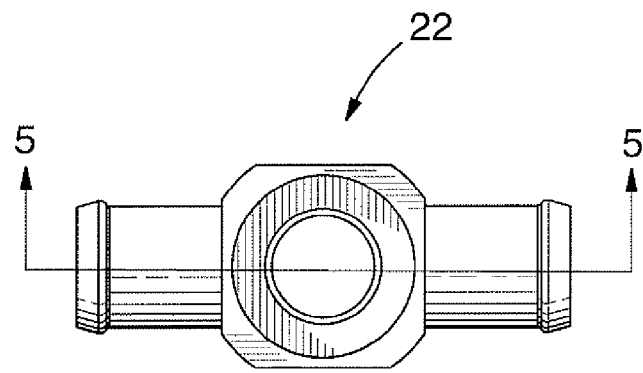
FIG. 4 is a top view of the structure of FIG. 3.
Figure 5:
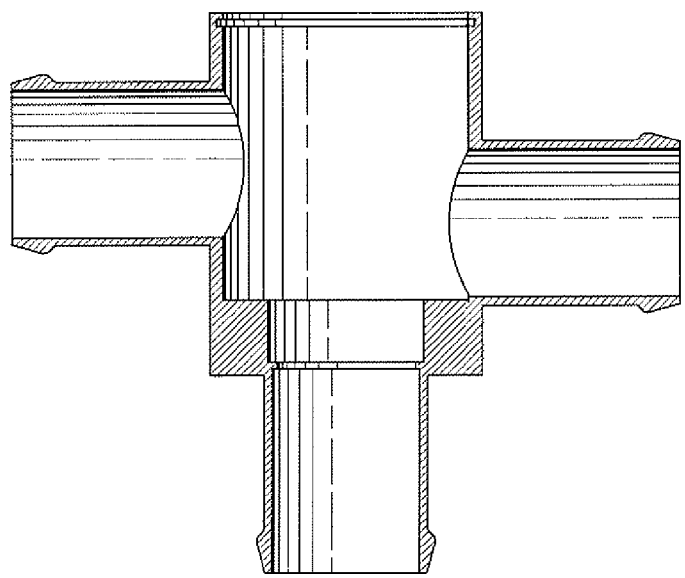
FIG. 5 is a section along 5-5 of FIG. 4.

With reference to FIG. 2, the valve 20 comprises a housing 22 and a valve cartridge 24.

This housing 22 is of aluminum and includes a central portion 26 defining an open receptacle and three spigots 28,30,32 extending therefrom in a tee arrangement, each leading into the open receptacle. Two of the spigots 28,30 are substantially parallel and opposed to one another. The third spigot 32 extends transversely to the others. The inner surface 34 of the receptacle has a peripheral groove 36 extending therearound.

The valve cartridge 24 includes an aluminum insert 38, an aluminum plug 40, an actuator 42 and a rubber O-ring 44.

Figure 13A:
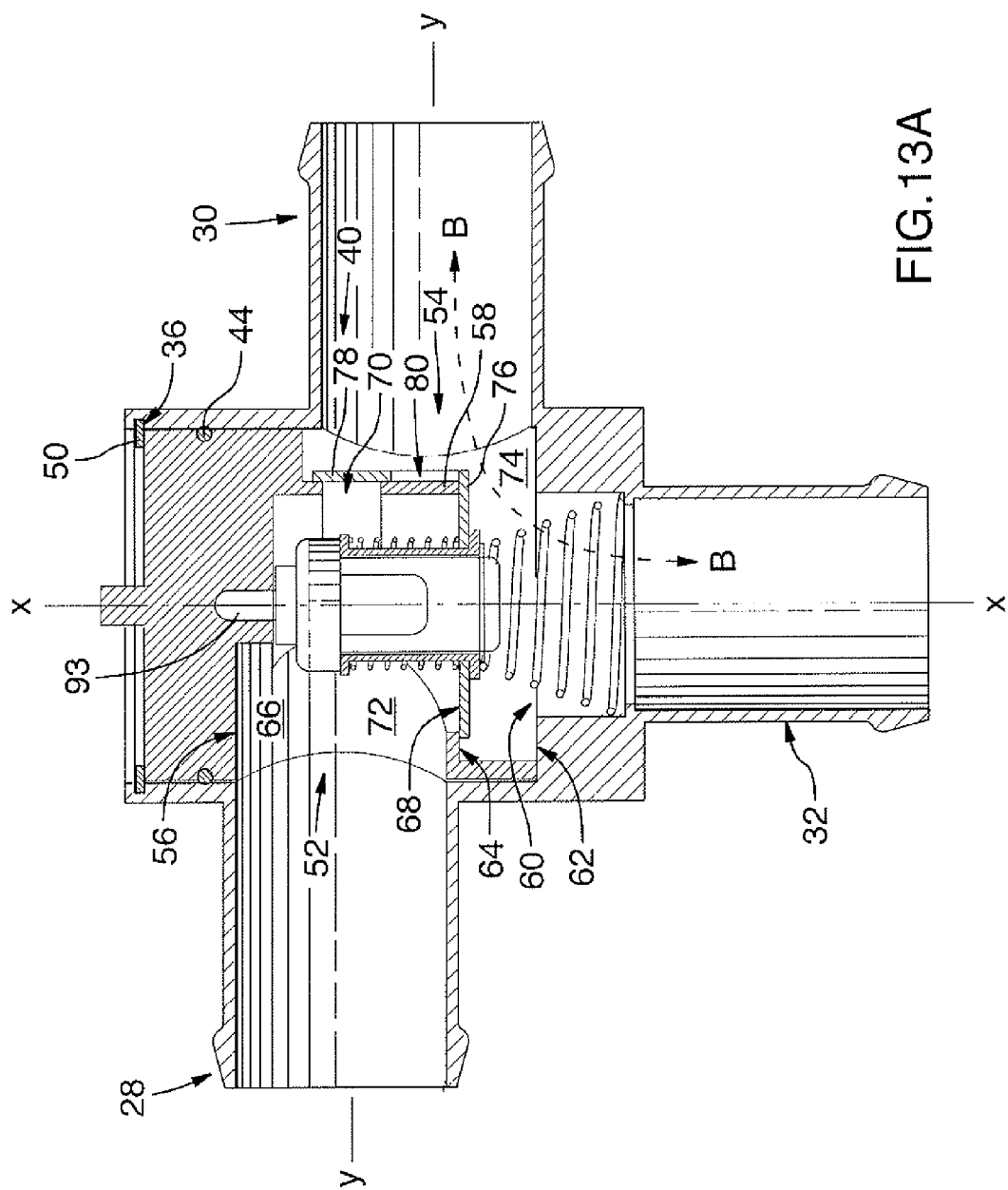
FIG. 13A is a view similar to FIG. 5 of the valve of FIG. 1, showing a wax motor in a fully retracted arrangement and the valve in a bypass configuration thereof.

The insert 38 has a peripheral groove 48 which receives the O-ring 44 and can be fitted in the receptacle 26 and secured in place with a spring clip 50 which interfits in groove 36, as indicated in FIG. 13A. So secured, the O-ring 44 sealingly engages each of the insert 38 and the inner surface 34 of the receptacle 26, to seal the insert 38 and housing 22 to one another, such that the insert 38, the O-ring 44 and the housing 22 together define a valve body.

With reference to FIG. 13A, the valve body has a pair of flow ports 52,54, an interior surface 56, an axis X-X, an interior wall 58, a further port 60, a first valve seat 62 and a second valve seat 64. The flow ports 52,54 are spaced-apart from, substantially opposed to and substantially aligned with one another, and communicate one each with the parallel spigots 28,30. Flow ports 52,54 are each orientated substantially transverse to axis X-X.

Figure 20:
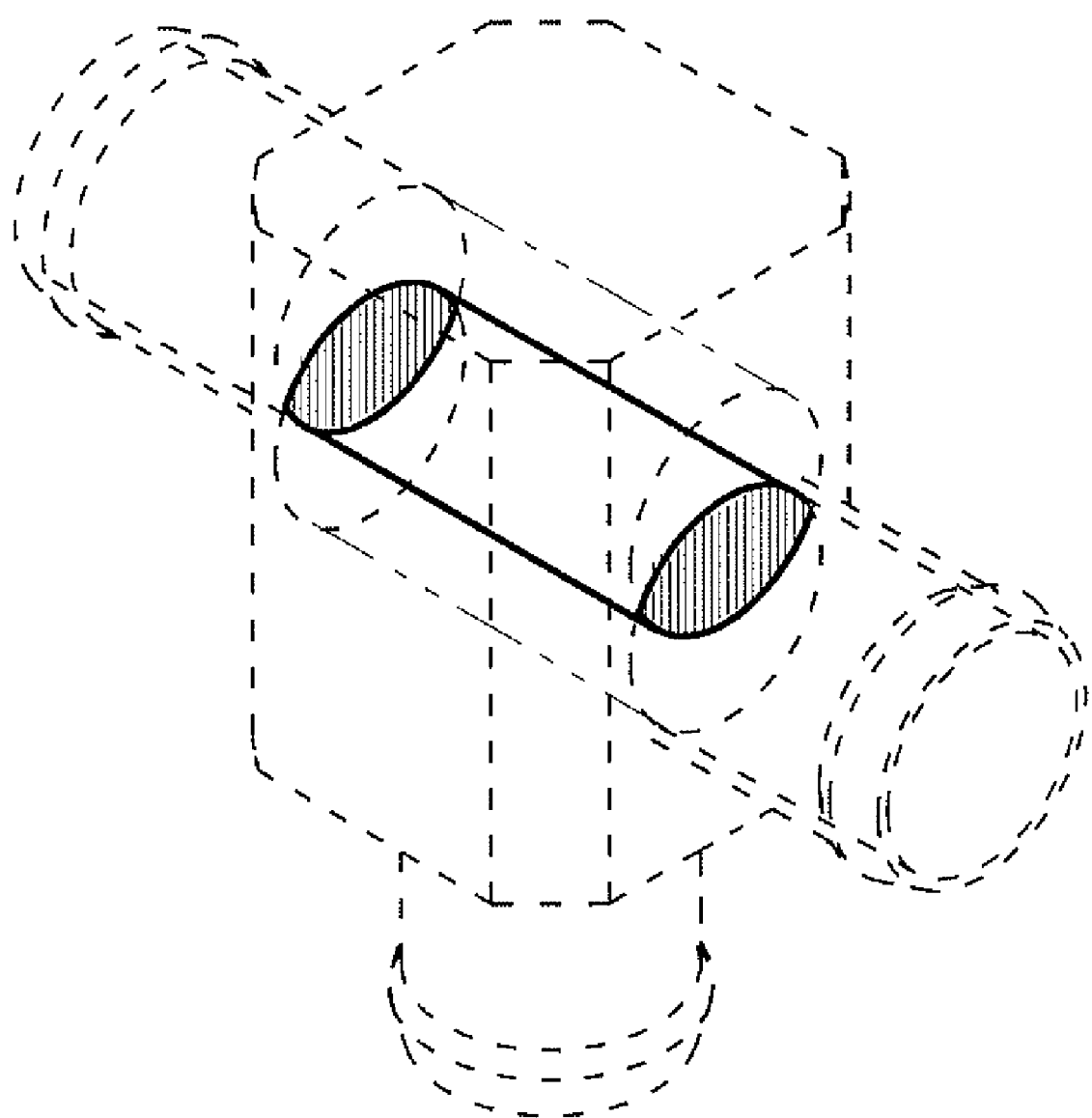
FIG. 20 is a phantom view of the valve of FIG. 1, showing a blacklined volume which represents the extent to which the flow ports are directly aligned.

In this disclosure and in the appended claims, "substantial alignment" of the flow ports 52,54 means that, if one were to project the flow ports across the valve body parallel to their respective flow directions, the projections would intersect to a substantial extent, as indicated by FIG. 20, wherein the valve is shown in phantom and the volume of intersection is indicated by the blacklined volume.

The interior surface 56 defines an interior chamber 66 of the valve body which is disposed between the flow ports 52,54 and communicates therewith. The axis X-X is aligned with the third spigot 32, and orientated transversely to a flowthrough direction Y-Y with which the flow ports 52,54 are substantially aligned. The interior wall 58: is a generally semi-cylindrical structure centred about the axis X-X; extends axially, partially across the interior chamber 66; defines, in combination with the interior surface 56, an interior opening 68; and has a wall opening 70 therethrough. Wall opening 70 is opposed to and aligned with flow port 52, i.e. wall opening 70 and flow port 52 present to one another. Flow port 54 and wall opening 70 are aligned, i.e. if one were to project flow port 54 parallel to its flow direction (not shown), the projection would intersect with wall opening 70 to a substantial extent. The interior wall 58, in combination with portions of the valve body, notionally define a tubular structure, in which the interior opening 68 defines an open end and of which the interior wall 58 defines a side wall. The interior opening 68 provides for communication between a first subchamber 72 of the interior chamber 66 to which one 52 of the flow ports leads and a second subchamber 74 of the interior chamber 66 to which the other 54 of the flow ports leads. The second subchamber 74 extends partially around the side wall and beyond the open end of the tubular structure described hereinbefore. The wall opening 70 in the interior wall 58 also leads between the first 72 and second 74 subchambers. Both the interior wall 58 and the wall opening 70 thereof each circumscribe an angle of about 180°. The further port 60 provides for communication between second subchamber 74 and third spigot 32. The first valve seat 62 surrounds the further flow port 60 and is defined by the interior surface 56 of the valve. The second valve seat 64 surrounds the interior opening 68, is axially spaced from the first valve seat 62 and is defined by the interior surface 56 and by the end of the interior wall 58.

Figure 6:
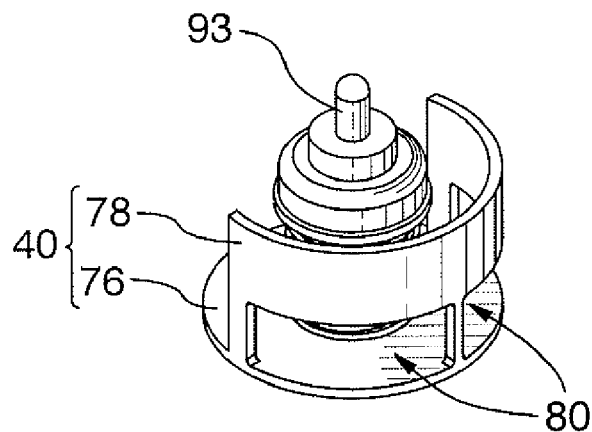
FIG. 6 is an enlarged view of encircled area 6 of FIG. 2.
Figure 7:
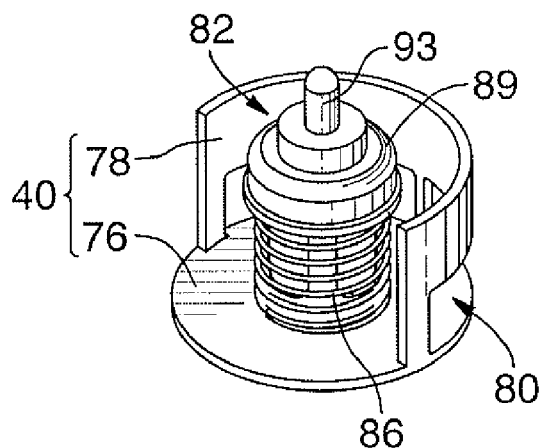
FIG. 7 is a perspective view of the structure of FIG. 6, from another vantage point.
Figure 8:
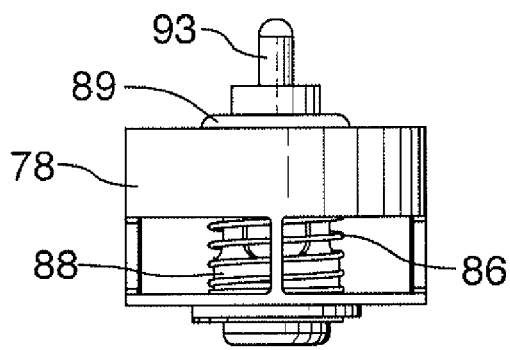
FIG. 8 is a side view of the structure of FIG. 6.

As best seen in FIGS. 6-8, the plug 40 has a circular base portion 76 and a semi-cylindrical sidewall portion 78 extending from the base portion 76. Sidewall portion 78 has a bisected plug opening 80 therein, and each of the side portion 78 and the plug opening 80 circumscribe an angle of about 180°. In FIG. 13A, the plug 40 is shown in a first position in the interior chamber 66. So positioned, base portion 76 and side portion 78 are both centred about the axis X-X, such that side portion 78 is concentric with the interior wall 58, the interior wall 58 is nested within plug 40, the base portion 76 is seated on the second valve seat 64, the interior wall 58 overlies the plug opening 80 and the side portion 78 overlies the wall opening 70 to at least substantially isolate the first subchamber 72 of the interior chamber 66 from the second subchamber 74. This defines an arcuate (or bypass, when the valve is used as a bypass valve) flow configuration of the valve 20, whereat the valve 20 defines a further flow path B-B through the valve body between spigots 30,32 via flow port 54 and further port 60.

Figure 13B:
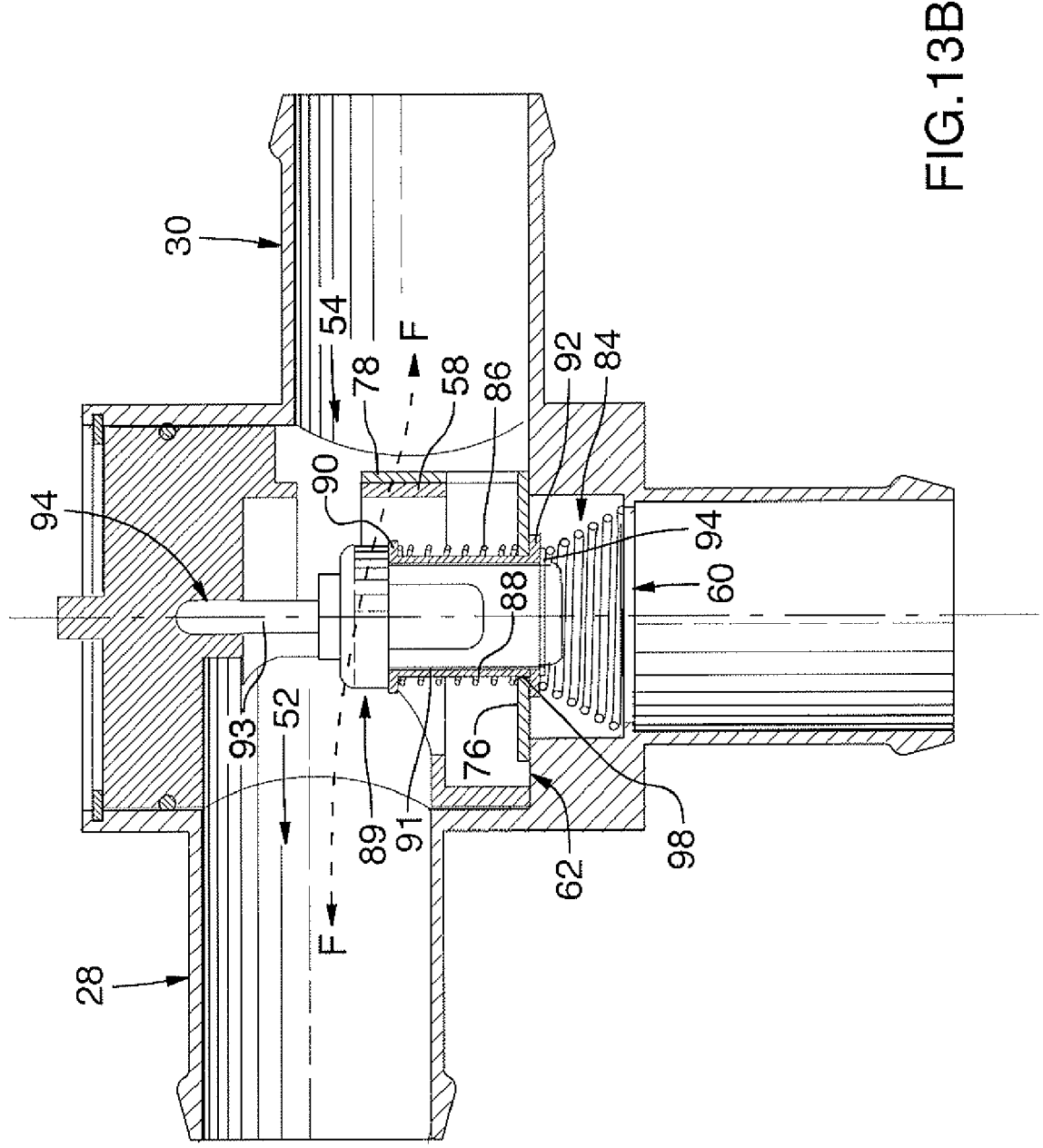
FIG. 13B is a view similar to FIG. 13A, showing the wax motor in a partially extended arrangement and the valve in a flowthrough configuration thereof.

The actuator 42 is for axially moving the plug 40 in the interior chamber between the first position shown in FIG. 13A and a second position shown in FIG. 13B. In the second position of the plug 40, the base portion 76 is seated on the first valve seat 62, to at least substantially occlude the further port 60. This defines a flowthrough configuration of the valve 20, whereat the valve 20 defines a primary flow path F-F through the valve body between spigots 28,30 via flow ports 52,54. In such configuration, it will be observed that the side portion 78 of the plug 40 and the interior wall 58 are arranged behind one another, to maximize the area through which fluid may flow. The primary flow path is a split-flow arrangement, with a first flow path between ports 52,54 being by way of the wall opening 70 and a second flow path between ports 52,54 being through the open end of the tubular structure, i.e. interior opening 68 and the plug opening 80. In this position of the plug 40, the plug opening 80 and flow port 54 are aligned.

With reference to FIGS. 2, 6-8 and 13B, the actuator 42 shown includes a wax motor 82, a conical stainless steel return spring 84, a stainless steel override spring 86 and an aluminum tubular sleeve 88. The sleeve 88 has annular flanges 90,92 extending around each end and extends through an opening 98 in the circular base portion 76. The flanges 90, 92 provide for the sleeve 88 to be captured by the circular base portion 76. The wax motor 82 is of a conventional type which includes a shell 91 having an enlarged head 89 from which a shaft 93 protrudes, the shaft 93 moving in response to thermally-induced expansion of the wax-like material (not shown) contained within the shell 91. The motor 82 is fitted in the sleeve 88, and a C-clip 94 is secured thereto, such that enlarged head 89 and the C-clip 94 capture therebetween the sleeve 88. The shaft 93 projects from the wax motor 82 into a socket or recess 94 formed in the insert 38. The conical return spring 84 extends between the sleeve flange 92 which is captured by the C-clip 94 and the bypass port 60. The override spring 86 is fitted around the sleeve 88 and extends between the sleeve flange 90 which is captured by the enlarged head 89 and the base portion 76 of the plug 40.

In operation, when the temperature of the wax in the wax motor 82 is below the wax-actuator set point, the wax-like material volume is relatively low, such that the shaft 93 can fit substantially within the shell 91. Bias provided by the return spring 84 ensures that the shaft 93 is positioned within the shell 91 sufficient to enable flange 92 to retain base portion 76 of the plug 40 against the second valve seat 64, as shown in FIG. 13A. This corresponds to a fully retracted arrangement of wax motor 82.

Figure 13C:
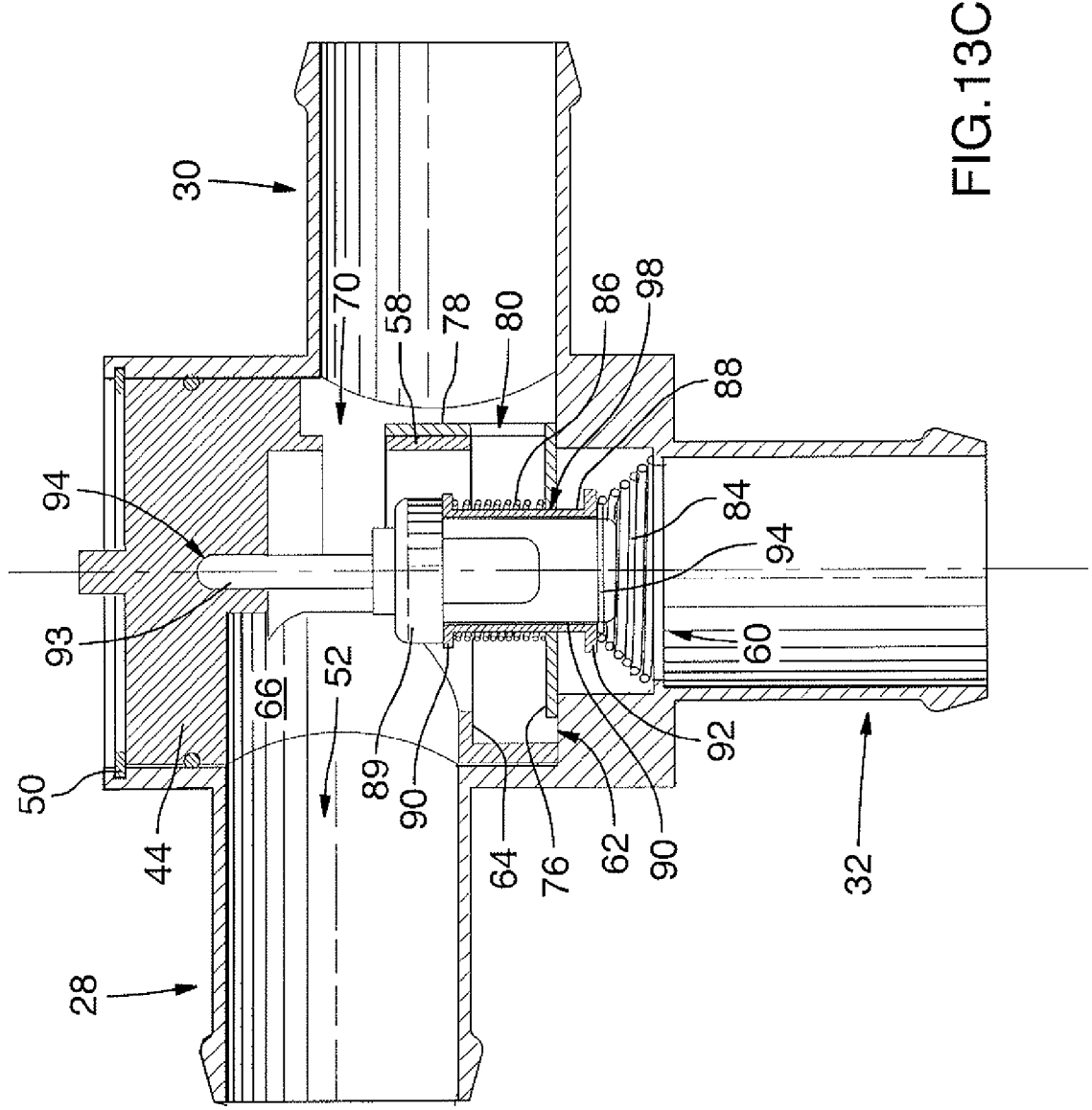
FIG. 13C is a view similar to FIG. 13B, showing the wax motor in a fully extended arrangement and the valve in the flowthrough configuration thereof.

When the temperature of the wax-like material in the motor 82 reaches or exceeds the actuator set point temperature, the wax-like material expands. This causes shaft 93 to be partially expelled from the shell 91. As the shaft 93 cannot extend through the socket 94, extension of the shaft 93 from the shell 91 is accommodated by movement of the shell 91, and the sleeve 88 by which it is mechanically captured, away from the socket 94. Initially, as the shell 91 moves away from the socket 94, bias provided by the override spring 86 causes the base portion 76 to remain engaged against flange 92 during such movement, such that movement of the shell 91 corresponds to movement of the plug 40. In the course of such movement, the plug 40 will ultimately reach the second position, as shown in FIG. 13B. This corresponds to a partially-extended arrangement of the wax motor 82. At this point, the base portion 76 of the plug 40 is seated against the first valve seat 62, and can move no further; if the wax-like material requires further expansion volume, this will be accommodated by movement of the sleeve 88 through the opening 98 in the base portion 76, as shown in FIG. 13C. This corresponds to a fully-extended arrangement of the wax motor 82. Persons of ordinary skill will recognize that this arrangement is advantageous, since the shaft extension in any given wax motor or in a manufactured batch thereof can vary. By providing an override spring arrangement, a valve designer can ensure that the valve will move predictably between the first and second positions in response to temperature change, and can also avoid undue stresses in the valve that might follow if accommodation was not made for overextension.

When the temperature of the wax-like material in the wax motor 82 falls beneath the set point, the conical return spring 84 will drive the shell 91 back over the shaft 93. Until such time as flange 92 of the sleeve 88 engages base portion 76, bias provided by override spring 86 will maintain base portion 76 seated against the first valve seat 62. Expansion of the conical spring 84 beyond that point will result in movement of the sleeve 88 and plug 40 together, during which movement, the interior wall 58 telescopes into the plug 40. Ultimately, the plug 40 returns to the first position, and further movement is arrested by engagement of the base portion 76 with the second valve seat 64.

In one use, the valve of FIG. 1 is used as a bypass valve and deployed in an automobile cooling circuit. In this use (not shown), spigot 30 receives a hose (not shown) through which coolant from the engine is received, spigot 28 is coupled by a hose to the radiator inlet (neither shown) and the further spigot 32 is coupled by a hose through which coolant is delivered to the engine. When the coolant temperature is below the wax actuator set point (and wherein the coolant is not sufficiently heated to be required to shed heat), the wax-motor is maintained in the fully-retracted position, the plug is disposed in the first position and the valve is disposed in the bypass configuration, such that most of the coolant follows path B-B back to the engine. Thus, in this use, port 54 is an inlet port and ports 52, 60 are outlet ports. In the bypass configuration, leak paths exist in the seal between the base portion 76 of the plug 40 and the second valve seat 64, in the junction between interior portion 58 and side portion 78, in the junction between sleeve 88 and opening 98 in the base portion 76 and in the junction between the shell 91 and the sleeve 88. Thus, the wax motor 82 is not entirely isolated from the flow, so as to be susceptible to actuation when the flow temperature exceeds the wax set point. When this occurs, the plug 40 moves to the second position and the valve assumes the flowthrough configuration, such that most of the coolant follows flow path F-F through the radiator before being returned to the engine. Again, in this configuration, leak paths will exist, in the seal between the base portion 76 of the plug 40 and the first valve seat 64, in the junction between interior wall 58 and side portion 78, in the junction between sleeve 88 and opening 98 in the base portion 76 and in the junction between the shell 91 and sleeve 88.

Figure 14:
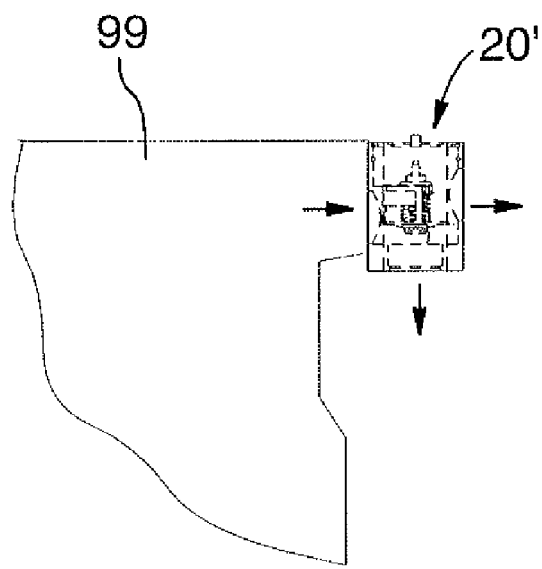
FIG. 14 is a schematic view of a valve similar to the valve of FIG. 1 in use in an engine block casting.

A similar use is shown schematically in FIG. 14. Herein, a valve 20' similar to that of FIG. 1 but lacking spigots is fitted in an engine block casting 99, with the flow ports forming part of the coolant circuit (not shown) from the engine to the radiator and the bypass port coupled to a circuit (not shown) which bypasses the radiator and returns to the engine. The operation of this valve 20' is functionally identical to the valve 20 and use thereof previously described, and thus is not further described herein.

Figure 15:
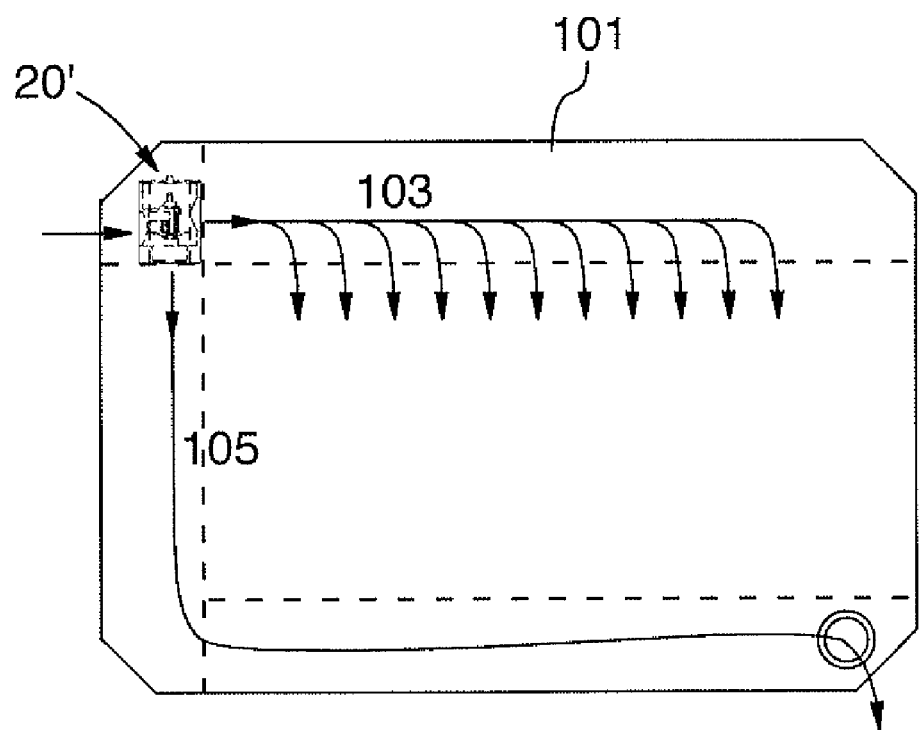
FIG. 15 is a schematic view of a valve similar to the valve of FIG. 1 in use in a radiator.

A further use of the valve 20' of FIG. 14 is shown schematically in FIG. 15. Herein the valve 20' is fitted in a radiator 101, with the flow ports forming part of a heat exchanging circuit 103 through which coolant is caused to traverse the heat exchanger 101 and shed heat before returning to the engine, and the bypass port forming part of a circuit 105 which bypasses the heat-exchanging portion of the radiator in its return to the engine. Again, the operation of this valve 20' is functionally identical to the valve 20 and uses thereof previously described, and thus is not further described herein.

It is notable that in each of the valves and uses described, there is found a cartridge 24 which contains all of the moving parts of the valve, so as to advantageously permit ready removal and replacement as required. The present valve has also been found to have relatively low pressure losses in use, which is known to be advantageous in the automotive field since it permits relatively smaller and lighter pumps to be utilized, with commensurate savings in automobile cost and weight.

Without intending to be bound by theory, it is believed that the advantageous flow characteristics of the present valve derive from the shape of the valve and its components. Notable in this regard, the primary flow path is substantially parallel to the flows leading to and from the valve. Further, each of the primary and further flow paths is free of substantial constrictions over their respective lengths owing, inter alia, to the relatively large volume of the second subchamber 74 which the flow traverses in the arcuate or bypass configuration of the valve, and to the relatively large area of openings 70,80 (similar in size to the area of each of the flow and further ports 52,54,60) through which the flow traverses in the flowthrough configuration of the valve. Additionally of note is the shape of the second subchamber 74 of the interior chamber, specifically, the upper portion thereof having a C-shaped or arcuate cross-section, which permits the flow entering from flow port 54 to spread out, around the side wall 78/interior wall 58, before passing under the base portion 76 and exiting the valve through the port 60.

Figure 16:
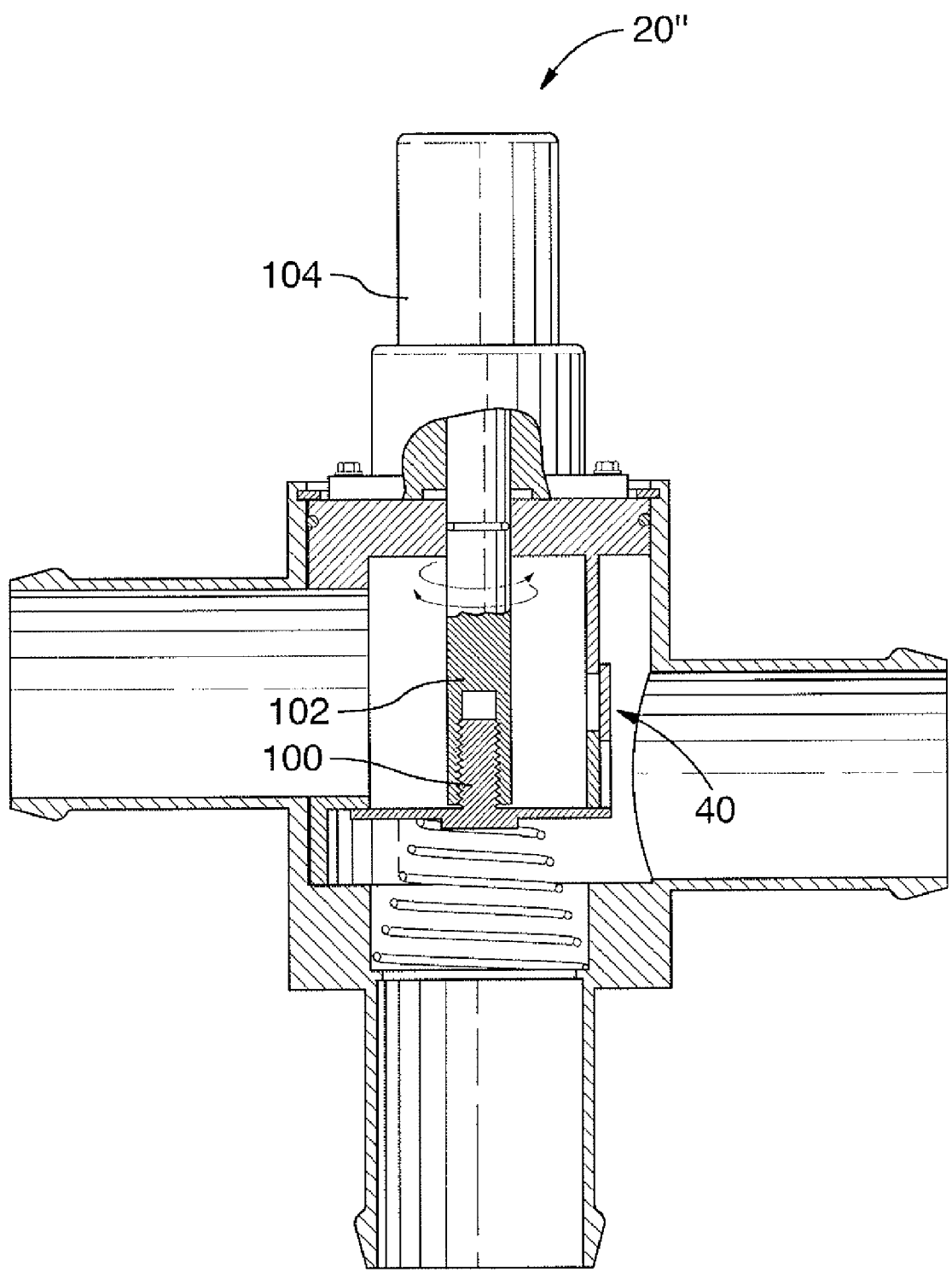
FIG. 16 is a view, similar to FIG. 13A, of a valve according to a second embodiment of the invention.
Figure 17:
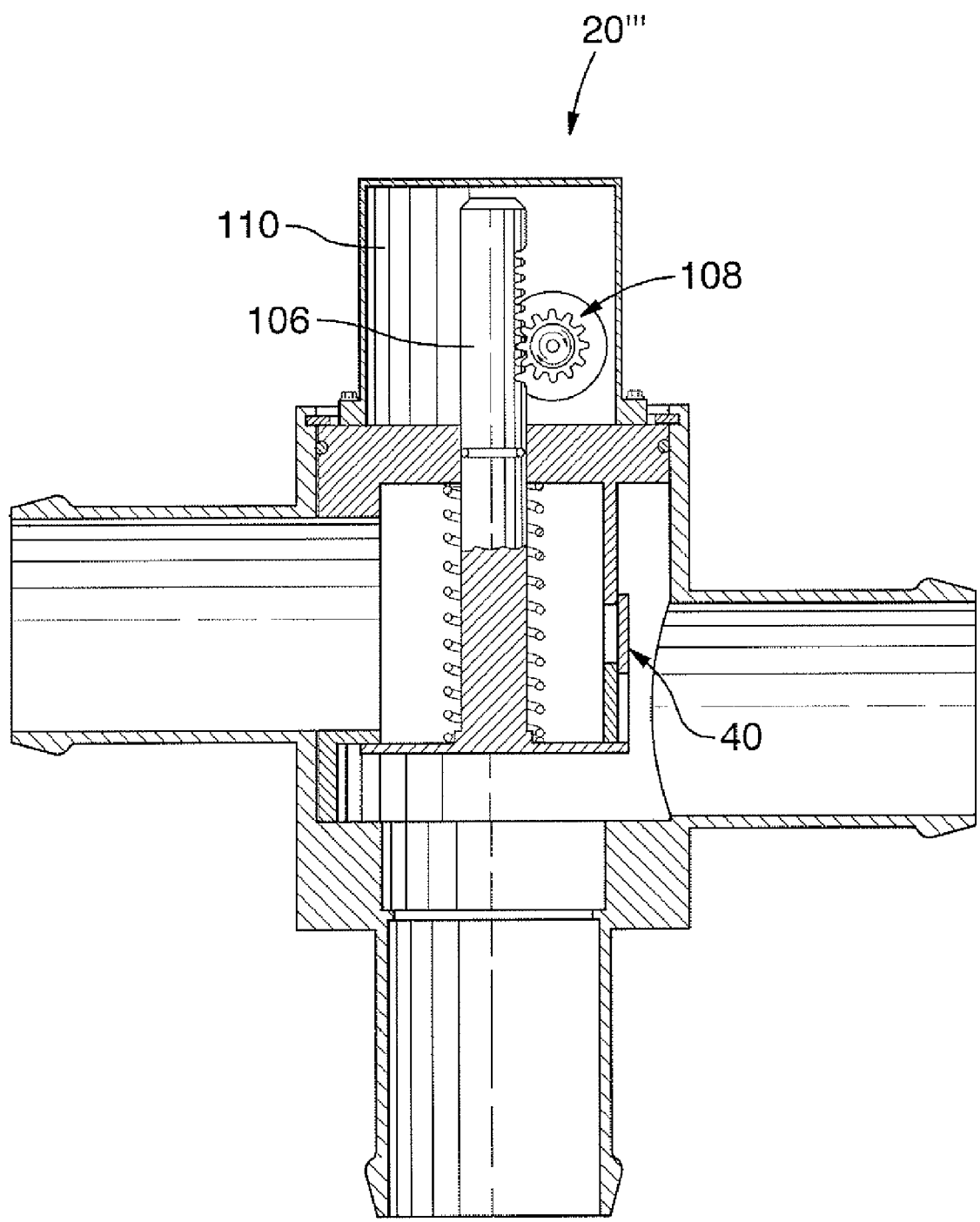
FIG. 17 is a view, similar to FIG. 13A, of a valve according to a third embodiment of the invention.
Figure 18:
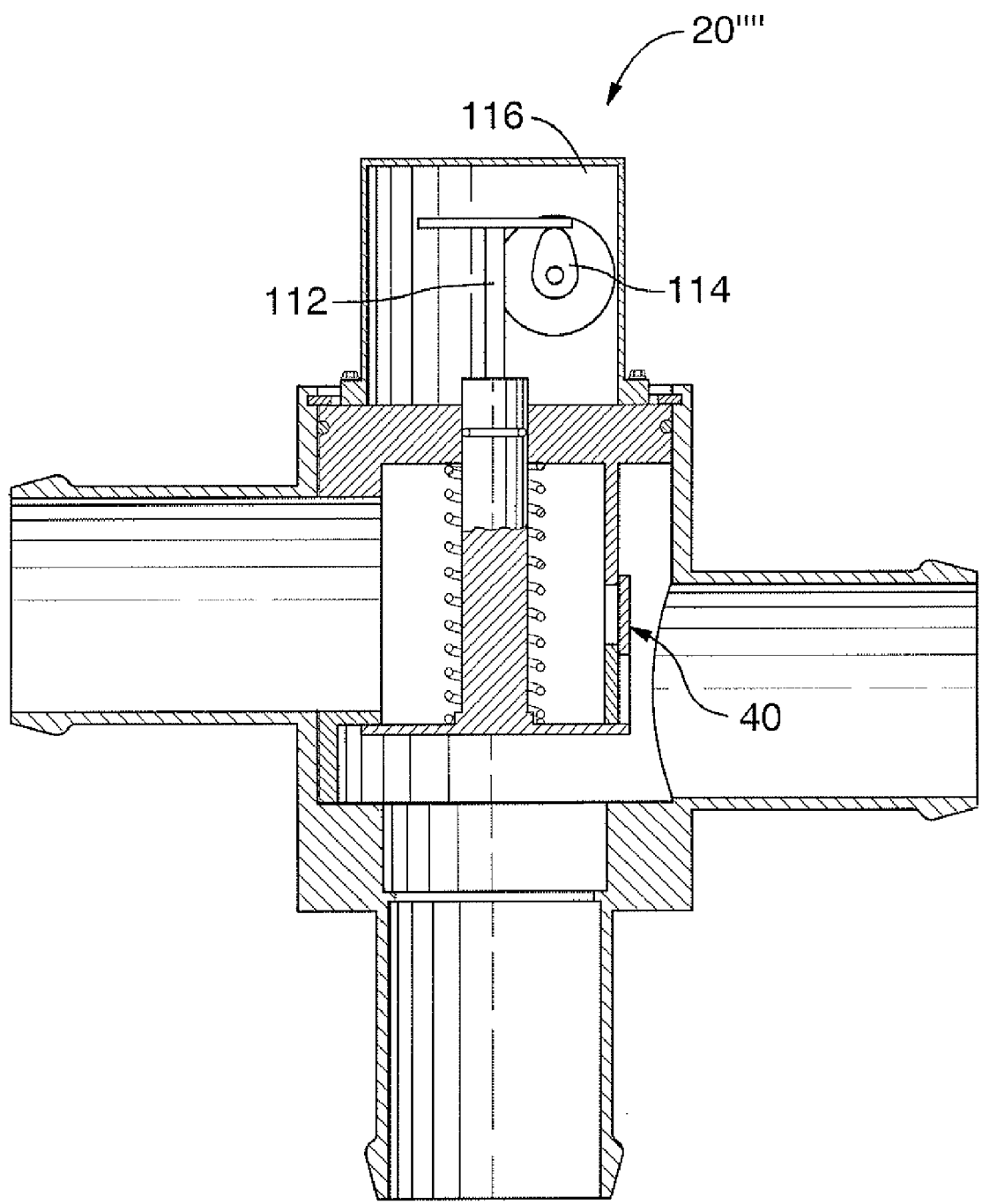
FIG. 18 is a view, similar to FIG. 13A, of a valve according to a fourth embodiment of the invention.

Various other embodiments of the valve are shown in FIGS. 16-18. These valves are similar in function to the valve of FIGS. 1-13C, but whereas the valve of FIGS. 1-13C employs a wax motor to drive the plug between the first and second positions, these valves employ other forms of actuators to accomplish the same function. FIG. 16 shows a valve 20'' wherein the plug 40 has a threaded post 100 axially extending therefrom which is received by an internally-threaded driveshaft 102 coupled to a motor 104. The motor 104 can rotate the drive shaft 102, which rotates about the threaded post 100, so as to result in axial movement of the post 100 and consequent movement of the plug 40 between the first and second positions. FIG. 17 shows a valve 20''' wherein a rack 106 extends from the plug 40, a pinion 108 is in mesh with the rack 106 and a motor 110 is drivingly coupled to the pinion 108. Herein, the motor 110 rotates the pinion 108 which drives the rack 106 axially to move the plug 40 between the first and second positions, FIG. 18 shows yet another valve 20'''' wherein a cam follower 112 is coupled to the plug 40, a cam 114 is engaged with the cam follower and a stepper motor 116 is coupled to the cam 114. Herein, the stepper motor 116 rotates the cam 114 to engage the cam follower 112 and drive the plug axially between the first and second positions. In each of these cases, some form of external sensor or control would be used to trigger the movement of the plug. As the construction of actuators, sensors and controls of this type is routine to persons of ordinary skill in the art, and as the valves 20'', 20''', 20'''' operate in a manner substantially similar to valves 20 and 20', further description as to their respective construction and operation is neither necessary nor provided.

Figure 21:
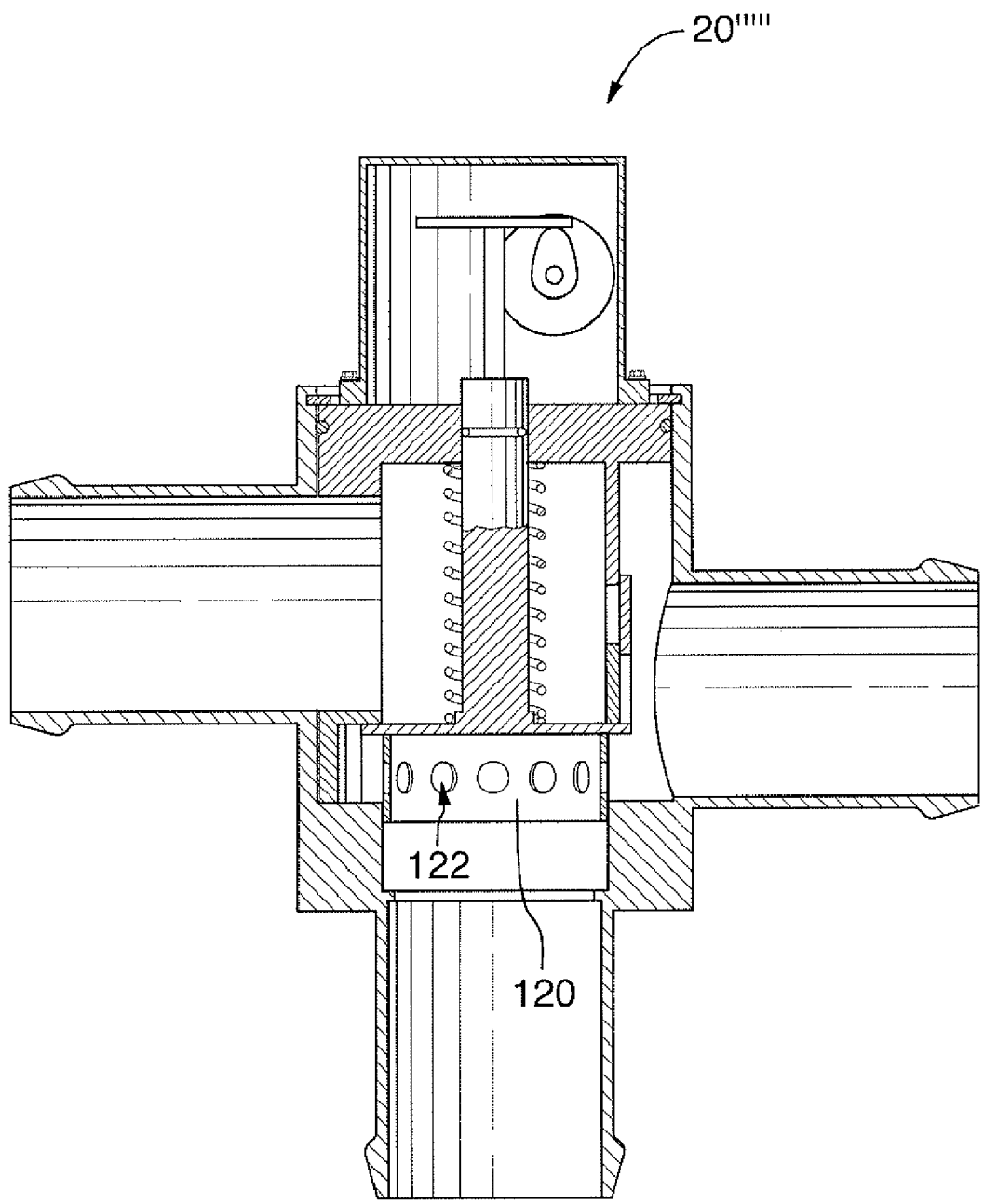
FIG. 21 is a view, similar to FIG. 19, of a valve according to a sixth embodiment of the invention.
Figure 22:
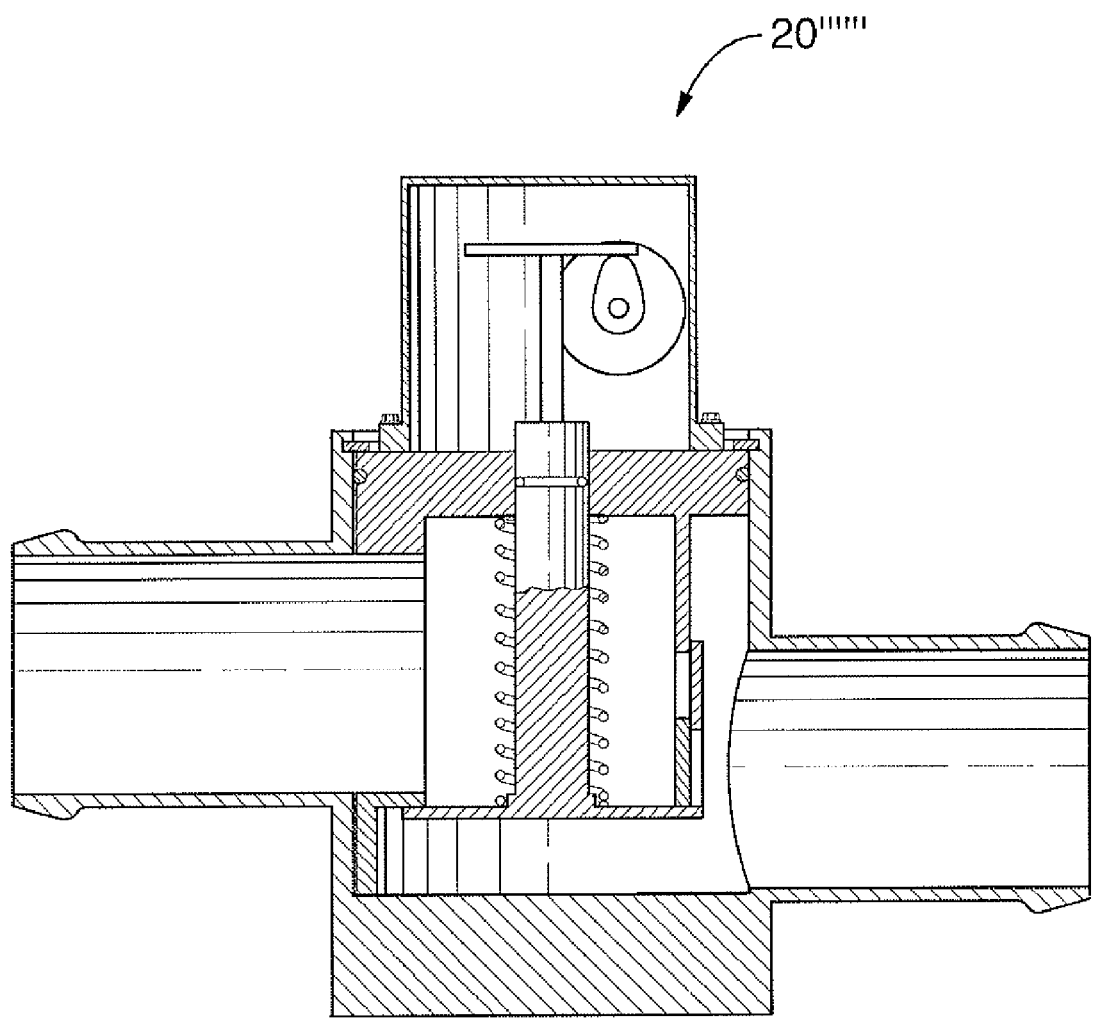
FIG. 22 is a view, similar to FIG. 19, of a valve according to a seventh embodiment of the invention.

A further possible modification is shown in the valve 20''''' of FIG. 21 which is similar to the valve of FIG. 18, but also includes a tubular skirt 120 which extends from the plug and telescopes into the further port. Herein, flow through the further port is restricted, by virtue of its need to pass through holes 122 defined in the skirt 120. By changing the shapes/sizes of holes 122, the flow characteristics of this valve can be modified at different points during movement between the first and second positions, to allow flow to be metered or linearized. In addition to the metering functionality, the skirt provides prealignment of the plug, which can assist in sealing and avoid binding.

A yet further modification is shown in the modified valve 20''''' of FIG. 21. This valve is substantially similar to the valve of FIG. 18, but lacks the further "bypass" port.

Whereas numerous embodiments and uses of the valve have been herein shown in described, it will be understood that various modifications can be made.

For example, whereas the valve is herein sometimes shown and illustrated as a bypass valve, wherein an input or inlet flow is directed to one of two outputs or outlets, it will be evident that the valve could be used as a mixing valve, wherein flow is selectively received from one of two inputs and delivered to a single output. In applications wherein port 52 is deployed as an inlet port, fluid pressure may tend to separate walls 78,58, and to avoid this, a skirt as shown in FIG. 21 may be advantageously utilized to stabilize the plug.

As well, whereas the description teaches movement of the plug between the first and second positions, it will be evident that the plug can assume intermediate positions, if flow is to be split, or if a split flow is to be received. In this case, of course, an actuator capable of moving the plug partially between the first and second positions, such as one of the actuators shown in FIGS. 16-18, would be used in substitution for wax motors which, while relatively inexpensive, robust and reliable in comparison to the actuators of FIGS. 16-18, generally lack proportional responsiveness, i.e. reliably move only between the fully retracted and the fully extended arrangements.

Figure 19:
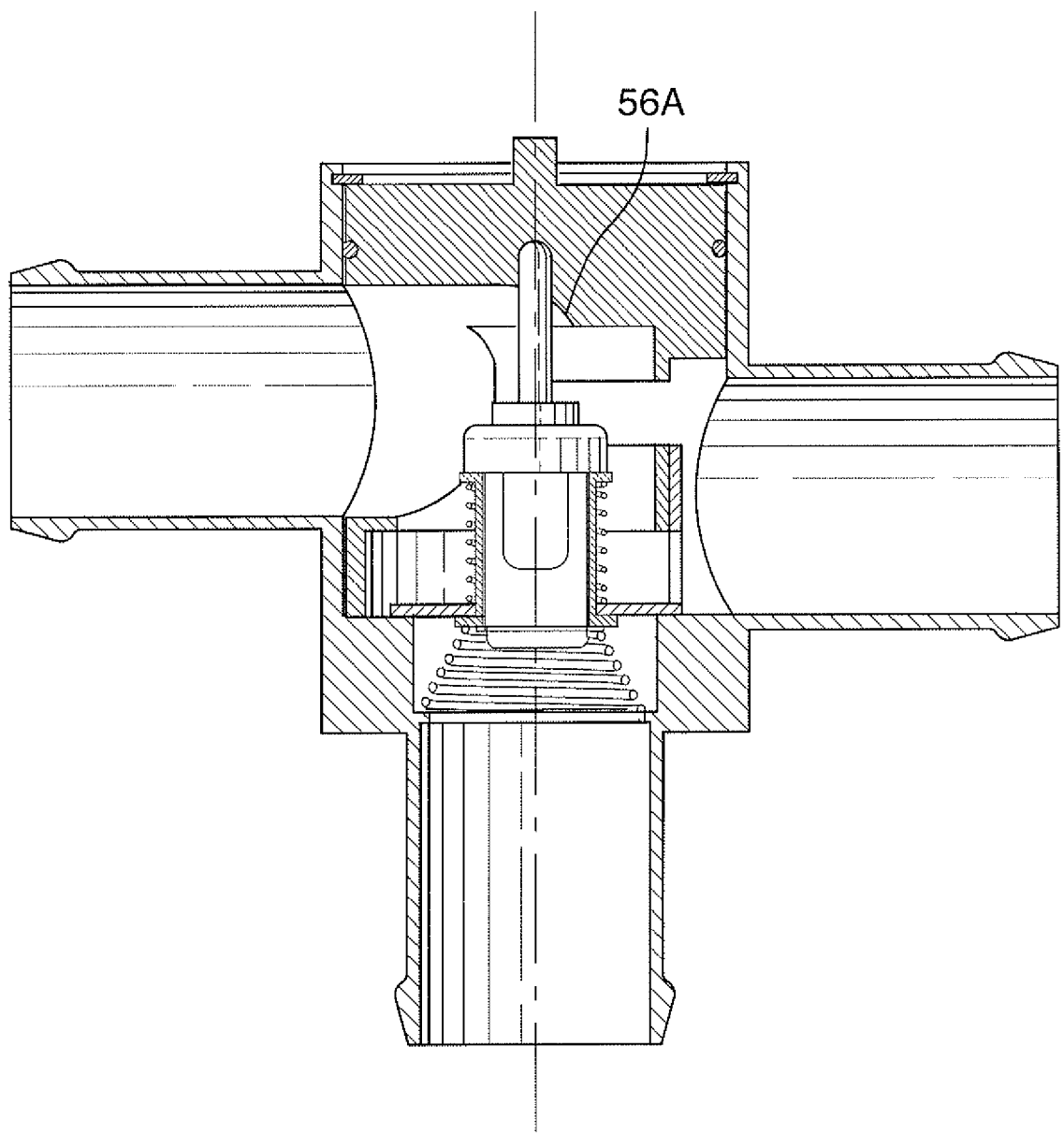
FIG. 19 is a view, similar to FIG. 13A, of a valve according to a fifth embodiment of the invention.

Further, whereas the valves illustrated and described have relatively good flow characteristics, improvements are contemplated to be achievable through interior contouring or streamlining, as suggested in FIG. 19, wherein a portion 56A of the interior surface 56 has been contoured for flow conditioning.

Yet further, whereas the valve of FIGS. 1-13C is indicated to be constructed of steel, aluminum and rubber, it will be evident that other materials, such as plastics, could readily be employed.

Additionally, although the valves shown and described herein are indicated to be of a cartridge type, so as to permit ready removal and replacement of the moving parts of the valve in the event of failure or excess wear, it will be evident that a cartridge-type construction need not be employed.

Moreover, whereas the plug opening shown and described is indicated to be bisected, it will be evident that this is not necessary. The plug opening could equally be defined by a single aperture, or by three or more apertures. Further, whereas the side portion of the plug and the interior portion are herein indicated to be semi-cylindrical and to circumscribe at least about 180°, this is not necessary. Semi-elliptical cross-sections might, for example, be employed, if a relatively "flatter" and "wider" valve was required. Additionally, whereas the flow ports and wall opening are substantially opposed to one another as shown in the illustrations, it should be understood that flow ports need not be opposed to one another, but could be disposed in angular relation to one another.

Further, whereas the interior wall is herein shown to partially divide the interior chamber, it is contemplated that the interior wall could extend fully across the interior chamber. In this arrangement, the plug would likely telescope interiorly into the first subchamber, and some form of perforation or aperture in the interior wall would likely be required to be provided, to mate with the plug opening when the plug is at the second position.

Additionally, it should be understood that "seal", as used in the disclosure and in the appended claims, does not necessarily contemplate a complete blockage of flow, but rather simply means that the parts in question cooperate or interact to restrict or arrest flow.

In view of the foregoing, it should be understood that the invention is limited only by the claims appended hereto, purposively construed.

The invention claimed is:

1. A valve for use with a fluid, said valve comprising:
a valve body having: a pair of spaced-apart flow ports; an interior chamber; an interior wall at least partially dividing the interior chamber into a first subchamber to which one of the flow port leads and a second subchamber to which the other of the flow ports leads, the interior wall having a wall opening therethrough leading between the first subchamber and the second subchamber; an interior opening providing for communication between the first subchamber and the second subchamber; and a further flow port spaced-apart from the interior opening along an axis; and a plug having a plug opening therein, the plug being axially moveable in the interior chamber between and a first position and a second position, wherein at the second position, the plug seals the further flow port and the valve defines:

a first flow path between the spaced-apart flow ports, through the wall opening; and a second flow path between the spaced-apart flow ports, through the interior opening and the plug opening, and at the first position, the interior wall seals the plug opening and the plug seals the interior opening and the wall opening, thereby to at least substantially isolate the first subchamber from the second subchamber and to channel the flow through a further flow path for said fluid through the valve body between the other of the flow ports and the further flow port.

2. A valve according to claim 1, wherein the spaced-apart flow ports are each orientated transverse to the axis.

3. A valve according to claim 1, wherein the first flow path and the second flow path collectively define a primary flow path, and wherein the primary flow path and the further flow path are each free of substantial constrictions over their respective lengths.

4. A valve according to claim 1, wherein the valve body has:

a first valve seat surrounding the further port and against which the plug is seated in the second position thereof; and a second valve seat surrounding the interior opening, axially spaced from the first valve seat and against which the plug is seated in the first position thereof.

5. A valve according to claim 1, further comprising an actuator for moving the plug between the first position and the second position.

6. A valve according to claim 1, further comprising an actuator for moving the plug between the first position and the second position in response to the temperature of the fluid.

7. A valve according to claim 1, wherein the interior wall telescopes into the plug during movement of the plug from the second position to the first position.

8. A valve according to claim 1, wherein the interior wall extends axially.

9. A valve according to claim 1, wherein the interior wall is semi-cylindrical and the plug has a semi-cylindrical sidewall concentric therewith.

10. A valve according to claim 9, wherein the plug opening and the wall opening each circumscribe an angle of at least about 180°.

11. A valve according to claim 1, wherein the spaced-apart flow ports are substantially aligned with and opposed to one another.

12. A valve according to claim 1, wherein the one flow port and the wall opening are substantially opposed to one another.

13. A valve according to claim 1, wherein the other flow port and the wall opening are substantially aligned with one another.

14. A valve according to claim 1, wherein the one of the flow ports is an outlet port and the other of the flow ports is an inlet port.

15. A valve for use with a fluid said valve comprising:

a valve body having a pair of spaced-apart flow ports, said valve body including a tubular structure having a side wall and an open end, the tubular structure defining interiorly a first subchamber in fluid communication with one of the flow orts and the wall having a wall opening therethrough; and defining a second subchamber in fluid communication with the other of the flow ports, the second subchamber extending around the side wall and extending beyond the open end to further fluidly communicate with the open end and the wall opening, a plug having a plug opening and being mounted to the tubular structure for telescopic movement between a first position and a second position wherein:

at the second position, the plug is disposed at least in part in the second subchamber and the valve defines:

a first flow path between the flow ports through the wall opening; and a second flow path between the flow ports through the open end of the tubular structure and the plug opening; and at the first position, the plug and tubular structure interact to restrict flow through the first flow path and the second flow path wherein the valve body has a further flow port spaced-apart from the open end of the tubular structure along an axis; the plug moves axially between the first position and the second position; at the second position, the plug seals the further flow port; and at the first position of the plug, the valve defines a further flow path for said fluid through the valve body between the other of the flow ports and the further flow port.

* * * * *